Oct. 9, 1956 W. G. ROWELL 2,765,802
MAGNET CONTROLLED SHUT-OFF VALVE
Filed Dec. 31, 1949
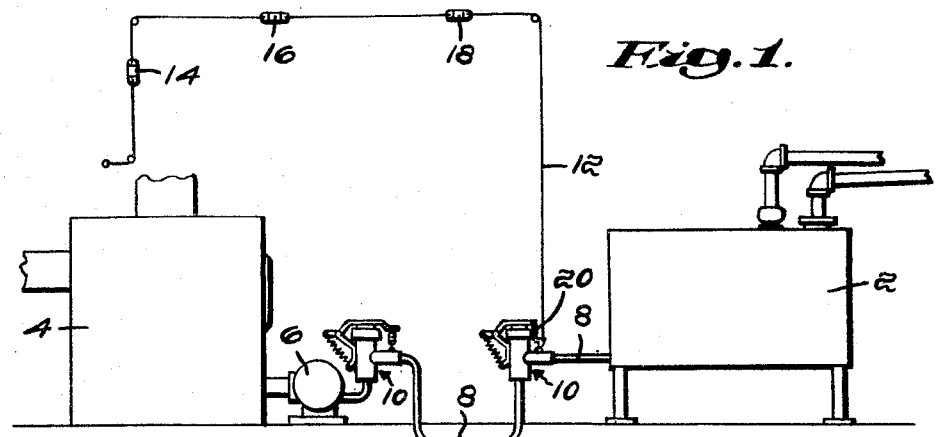
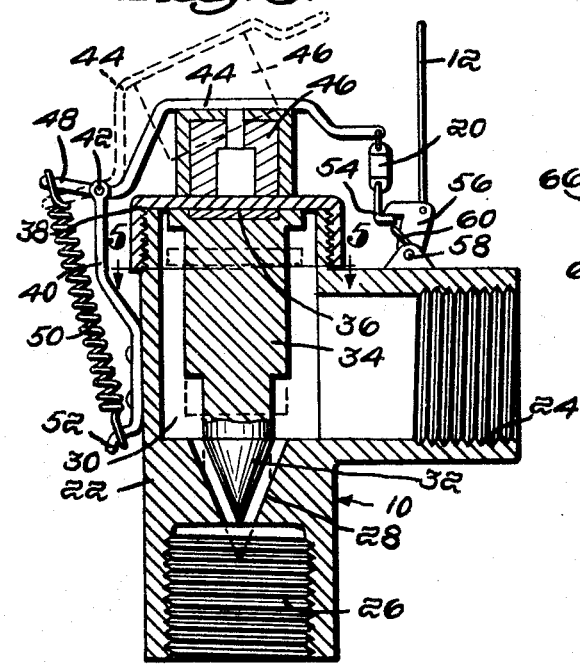
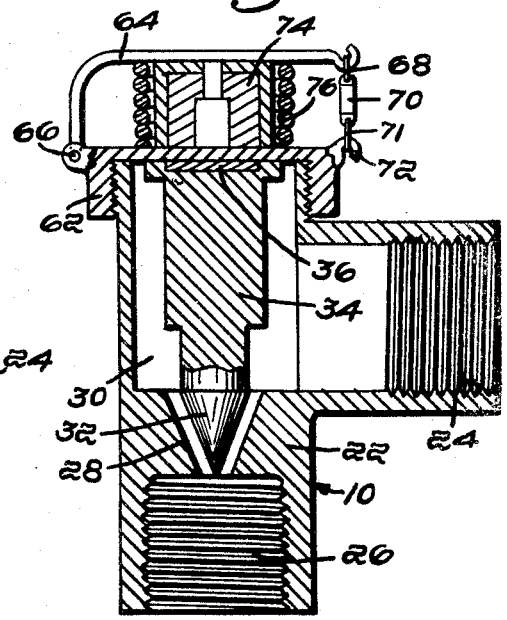
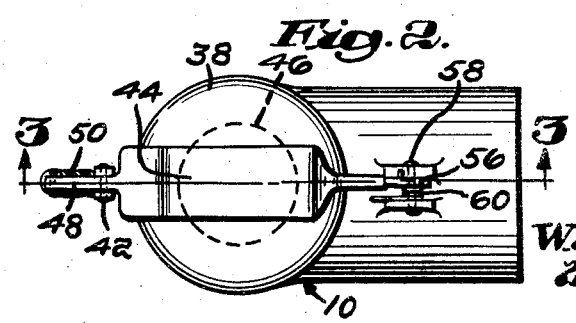
Inventor:
William G. Rowell,
by C. Yardley Chittick
Attorney United States Patent Office 2,765,802
Patented Oct. 9, 1956

2,765,802

MAGNET CONTROLLED SHUT-OFF VALVE

William G. Rowell, Quincy, Mass., assignor to Scully Signal Company, Cambridge, Mass., a corporation Application December 31, 1949, Serial No. 136,303

4 Claims. (Cl. 137—75)

This invention relates to valves.

The invention is particularly concerned with that type of valve known as a magnetic valve in which the valve member located within the interior of the valve housing is actuated or controlled by magnetic means exterior of the housing. The magnetic valve of the present invention may, of course, be used wherever it may suitably fill the need, but in the present application, the valve is shown as used in connection with a household fuel oil tank and oil burner.

Conventional valves when used with certain types of fluids, particularly those of relatively low surface tension, are difficult to keep tight so that over a period of use, there will be slow continuous leakage. For example, safety valves used in connection with fuel oil tanks which rely on a weight or spring to close them after the melting of a fusible link must of necessity work freely if closure is to occur positively when an emergency arises. In such valves, the packing around the valve stem must not be too tight lest the valve stick. Therefore, if the packing is loose enough so that the valve can work freely, there will almost certainly be some seepage.

Accordingly it is an object of the present invention to provide a leakproof, positively acting valve which has no physical communication with the exterior. The magnetic valve disclosed herein is of this type. It assures against any leakage during normal use and is capable of acting positively to close the fuel line when required.

Another object of the present invention is to provide a magnetic type valve which may function automatically under certain conditions.

Another object of the invention is the provision of a magnetically operated valve maintained in open position by heat sensitive means. The heat senstive means is positioned where it will function when subjected to a high temperature to permit the valve to close. More specifically the arrangement is such that if fire occurs in proximity to the valve the rising temperature so produced will cause one or more fusible links to melt to enable the magnetic valve to close to shut off the oil supply to the burner.

These and other objects of the invention will become more apparent as the description proceeds with the aid of the accompanying drawings in which—

Fig. 1 is a diagrammatic representation of a fuel oil tank burner and boiler with two magnetic valves introduced in the fuel supply line. The valves are shown disproportionately large for illustrative purposes.

Fig. 2 is a plan view of one form of the valve shown in Fig. 3.

Fig. 3 is a vertical section on the line 3—3 of Fig. 2.

Fig. 4 is a modified form of valve.

Fig. 5 is a section on the line 5—5 of Fig. 3 drawn to a reduced scale.

While the following description of the invention makes reference to the valve as being used in the fuel oil line of a conventional household heating system, it will be understood that this is not intended as a limitation, for the valve may be used elsewhere as may be expedient.

Referring to Fig. 1, the general arrangement of the elements includes a conventional fuel supply tank 2 with filling and venting connections, a furnace or boiler 4, an oil burner 6, a supply line 8 leading from the tank to the burner, and the magnetic valves generally referred to at 10. A safety device in the form of a wire 12 which includes a plurality of fusible links 14, 16, and 18 are located in a position where they would be most likely to receive heat in the event of a fire. In addition there is a fusible link 20 located directly on the valve which may act independently or in conjunction with the fusible links in wire 12.

The magnetic valve will normally be held in open position so long as all of the fusible links remain intact. With the melting of one or more of the links, the magnet controlling the valve will be released and moved to a position where it will no longer be effective so that the valve member may drop to closed position instantly shutting off the supply of fuel passing through the pipe 8.

One form of valve 10 is shown in Figs. 2 and 3. This consists of a valve housing 22 having a lateral internally threaded extension 24 and a vertical internally threaded lower extension 26, both of which may be placed in threaded connection in series with the supply line 8.

A tapered valve seat 28 leads from the interior 30 of the housing to the outlet and is adapted to receive a corresponding tapered valve pin 32 which extends downwardly from a valve pin carrier 34 triangular in cross section as shown in Fig. 5 and having affixed to its top a flat magnetic member 36. The upper end of the housing is closed by a threaded cap 38 which makes a fluid-tight engagement with the housing. Valve pin carrier 34 is in loose running engagement with the wall of the valve interior 30 so that valve pin 32 will be properly guided.

It is believed clear from the disclosure in Fig. 3 that the valve pin assembly may move upwardly until the magnetic member 36 hits the underside of cap 38 and may move downwardly until the valve pin 32 is in engagement with valve seat 28. The movement and control of the valve assembly is influenced by the position of a movable magnet which will now be described.

A support 40 attached to the side of the housing, has pivoted thereto at 42 a lever 44 shaped as shown to which is affixed on its underside a small, powerful horseshoe magnet 46. Lever 44 has a short extension 48 with a coil spring 50 affixed to the end thereof and to the lower end of bracket 40 at 52. The tension of the spring is sufficient to raise the magnet to the dotted line position of lever 44 whenever the lever is not held in its horizontal position.

The right hand end of lever 44 has depending therefrom a fusible link 20 previously referred to, which terminates in a small hook element 54. This hook is engaged by a corresponding hook 56 pivoted at 58 and normally urged clockwise by a small coil spring 60. Hook 56 is connected to the end of wire 12 so that as long as wire 12 is in tension, hook 56 will remain in engagement with hook 54 as shown in Fig. 3.

Thus, so long as the two hooks 54 and 56 remain engaged, the magnet 46 will be in full line position where it will be close enough to the magnetic member 36 to draw the valve assembly to uppermost open position so that fluid can flow through the pipe 8. If, however, hooks 54 and 56 become disengaged due to wire 12 becoming slack from the melting of links 14, 16 or 18 or if fusible link 20 melts, then the strength of spring 50 will be sufficient to swing lever 44 counterclockwise to the dotted line position thereby moving magnet 46 to a point where the magnetic influence on magnetic member 36 will be reduced to a degree insufficient to maintain the valve assembly in upper position. When this occurs, the weight of the valve assembly will cause the unit to drop, placing valve pin 32 in engagement with valve seat 28 thereby cutting off the flow of fluid through pipe 8. The pressure of the fluid in the tank against the upper surface of member 36 will assist in keeping the valve tightly closed.

When it is desired to reset the valve, it will first be necessary to replace any fusible links that had melted and then by hand, push the lever 44 to horizontal position so that the hooks 54 and 56 may be re-engaged. In this position, the magnet 46, being of sufficient strength, will raise the valve assembly again to open position. If it should be desired to close the valve, hooks 54 and 56 may be manually disengaged to allow the magnet to be moved to dotted line position.

A modified form of the invention is shown in Fig. 4. This differs from the construction of Fig. 3 in the spring arrangement that moves the magnet to inoperative position and the latch for holding the magnet lever in closed operative position.

The housing 22, valve assembly 34, extensions 24 and 26 are substantially the same as the previously described construction of Fig. 3. The threaded cap 62 which closes the top of the housing has a lever 64 hinged directly thereto at 66. The right hand end of the lever is held in latched position by the link 68 which includes a fusible member 70. The lower end of this link is connected by a hook 71 snapped into an eye 72 attached to cap 62. The magnet 74 is surrounded by a compressed coil spring 76 of sufficient strength to force lever 64 and magnet 74 counterclockwise when they are released by the melting of fusible member 70.

Fire ordinances generally require the use of two safety valves in the fuel line, one at the tank and the other at the burner. Thus in Fig. 1 a second valve 10 is shown in the line 8 at the burner. This valve has but a single fusible link and is not connected to the wire 12. Any suitable type of fusible link may be employed to hold the magnet in operative position. The link may include some type of manually operable latch as suggested by the hooks 54 and 56 shown in Fig. 3 or the hook 71 shown in Fig. 4.

In view of the foregoing explanation, it is believed that others familiar with this art will be able to devise other arrangements for shifting the position of the magnet upon the melting of a suitably positioned fusible link which will cause the valve to operate in the manner herein disclosed. Such alternative constructions should be considered as falling within the scope of this invention. Thus, while preferred forms have been shown and described, it is not intended that the invention is to be limited thereby but only by the appended claims.

I claim:

1. A magnetically operable valve forming an individual self-contained compact unit comprising a housing having an inlet and an outlet, a valve seat and a cooperating movable valve member for controlling the flow of fluid through said housing, said valve member including magnetic material, a magnet exteriorly positioned of said housing and carried by a movable member pivoted to said housing so that said magnet may be moved toward and away from said housing to attract or release said valve member thereby to vary the position of said valve, a spring urging said magnet in one direction with respect to said housing and a temperature controlled latch for maintaining said magnet in a position contrary to that being urged by said spring.

2. A magnetically operable valve forming an individual self-contained compact unit comprising a housing having an inlet and an outlet, a valve seat and a cooperating movable valve member for controlling the flow of fluid through said housing, said valve member including magnetic material, a magnet exteriorly positioned of said housing and carried by a movable member pivoted to said housing so that said magnet may be moved toward and away from said housing to attract or release said valve member thereby to vary the position of said valve, a spring urging said magnet away from said housing and a temperature controlled latch for maintaining said magnet in a position close enough to said housing to draw said valve member toward said magnet.

3. A magnetically operable valve forming an individual self-contained compact unit comprising a housing having an inlet and an outlet, a valve seat and a cooperating movable valve member for controlling the flow of fluid through said housing, said valve member including magnetic material, a magnet exteriorly positioned of said housing and carried by an arm pivotally related to said housing, a spring for urging said arm and magnet away from said housing, a temperature controlled latch holding said magnet close to said housing against the pull of said spring, said magnet when in latched position being strong enough to draw said valve member toward it, and when in unlatched position and moved away from said housing by said spring being of insufficient strength to control the movement of said valve member.

4. A magnetically operable valve forming an individual self-contained compact unit comprising a housing having an inlet and an outlet, a valve comprising a valve seat and a cooperating vertically movable valve member for controlling the flow of fluid through said housing, said valve member including magnetic material, a magnet carried by an arm pivoted to said housing so that said magnet can be swung to a position directly over the upper end of said valve member to draw said valve member upwardly to open said valve, and so that said magnet can be swung to a position remote from said housing so as to release said valve member from the control of said magnet so that said valve member may fall by gravity to close said valve, a spring constantly urging said magnet to said remote position and a temperature actuated latch for holding said magnet in valve actuating position in opposition to said spring.

References Cited in the file of this patent

UNITED STATES PATENTS

| 1,633,813 | Hawley | June 28, 1927 |
| 1,872,368 | Van Horn | Aug. 16, 1932 |
| 2,195,264 | Simpson | Mar. 26, 1940 |
| 2,199,974 | Whitney | May 7, 1940 |
| 2,226,210 | Silva | Dec. 24, 1940 |
| 2,341,041 | Hauser | Feb. 8, 1944 |
| 2,531,159 | Rowell | Nov. 21, 1950 |

FOREIGN PATENTS

| 132,267 | Austria | Mar. 10, 1933 |